United States Patent [19]

Stapley

[11] Patent Number: 4,564,322

[45] Date of Patent: Jan. 14, 1986

[54] DRILL SCOPE

[76] Inventor: Keith D. Stapley, 8950 E. 33rd Pl., Tulsa, Okla. 74145

[21] Appl. No.: 529,354

[22] Filed: Sep. 6, 1983

[51] Int. Cl.[4] .......................... B23B 49/00; G01C 9/28

[52] U.S. Cl. .......................... 408/16; 33/334; 33/384; 408/241 R

[58] Field of Search ............... 408/241 R, 16; 33/334, 33/384, 370, 373, 380, 390, 389

[56] References Cited

U.S. PATENT DOCUMENTS

| | | | |
|---|---|---|---|
| 953,863 | 4/1910 | Shaw | 33/334 |
| 1,333,559 | 3/1920 | Moulton | 33/384 |
| 2,525,387 | 5/1946 | Volk | 33/370 |
| 2,806,296 | 9/1957 | Weichert | 33/334 |
| 4,141,151 | 2/1979 | Jansky | 33/334 |
| 4,227,839 | 10/1980 | Conway | 408/241 R |
| 4,295,279 | 10/1981 | Sienknecht | 33/334 |
| 4,329,095 | 5/1982 | Schmuck | 408/112 |
| 4,402,141 | 9/1983 | Sterrenberg | 408/16 X |
| 4,457,078 | 7/1984 | Suchy | 408/16 X |

FOREIGN PATENT DOCUMENTS

| | | | |
|---|---|---|---|
| 525136 | 3/1931 | Fed. Rep. of Germany | 408/241 R |
| 2396614 | 3/1979 | France | 408/241 R |
| 267085 | 7/1970 | U.S.S.R. | 408/241 R |

*Primary Examiner*—William R. Briggs
*Attorney, Agent, or Firm*—Head, Johnson & Stevenson

[57] ABSTRACT

A drill scope comprising a calibrated protractor that can be read directly in terms of angle of tilt of the drill bit and a pivoting spirit level support means with tilt angle marker and bull's-eye bubble level that can be pivoted to a selected angle of tilt and then held in that position during use of the drill. In this manner, when the hand held drill is held such that the bubble reads level, the angle of tilt or inclination of the resulting hole can be readily maintained within one degree. The drill scope can be a U-shaped arm with level that swings over the entire drill housing, a circularly curved surface integrally mounted in the drill housing with a sliding element that holds the level or a calibrated protractor disc with radial support arm and level that attaches to the conventional side handle hole of the drill.

4 Claims, 11 Drawing Figures

DRILL SCOPE

BACKGROUND OF THE INVENTION

1. Field of the Invention

This invention relates to a drill scope for a hand held drill that assists the user in drilling at a desired angle of inclination or tilt. More specifically, this invention relates to an adjustable spirit level with protractor setting for maintaining the angle of inclination during drilling.

2. Description of the Prior Art

The basic concept of controlling the relative or absolute angle of tilt or inclination during drilling with a conventional drill is a well established commercial practice. Thus, virtually every machinist and machine shop is capable of drilling at a prescribed angle using various fixtures and a drill press or the like. However, the concept of using a hand drill at a predetermined arbitrary angle still represents a serious limitation to the use of such tools.

Various attempts have historically been proposed with varying degrees of success to control the angle of drilling by using a bubble spirit level attached to the drill. Thus, it is known to attach a spirit level to a hand held drill to insure that the drill is being held level. Also, it has been proposed to employ two levels to maintain either horizontal or vertical positioning of the drill during drilling. It has also been suggested to calibrate the glass face of the spirit level to achieve a range of angles. However, such an approach sacrifices accuracy in that the sensitivity of the bubble float diminishes drastically. Thus, an inexpensive and convenient method of maintaining the angle of a hand held drill during drilling to within a few degrees is still needed.

SUMMARY OF THE INVENTION

In view of the limitations of the prior art devices, I have discovered in a hand held drill the specific improvement comprising:

(a) a protractor means attached to the drill wherein the protractor means is calibrated in degree of tilt such as to correspond to the angle of tilt of the drill bit;

(b) an adjustable indexing means operably engaged to the drill and protractor means such as to be movable through an operative range of angles and be selectively held at one of the angles and wherein the index means cooperates with the calibration of the protractor means such as to indicate which angle of tilt is selected and wherein the adjustable indexing means is further adapted to hold a bubble spirit level such that the bubble reads level when the drill bit is tilted at the selected angle; and (c) a bubble spirit level attached to the adjustable indexing means.

The drill scope of the present invention is preferably either permanently attached to the drill, molded into the drill housing during manufacturing of the drill or a simple attachment that readily inserts into the side handle hole of many conventional drills. In the permanently attached embodiment, the adjustable indexing means is a U-shaped pivoting member, or the equivalent, with bubble spirit level attached midway through the curve. The protractor means is a circularly calibrated disc mounted to one side of the drill at the attachment point of one end of the U-shaped member. As the U-shaped member and spirit level are pivoted, the angle of tilt is read directly at the alignment between a marker and the calibrations of the protractor.

In the preferred drill manufactured embodiment, the top/back side of the drill housing is fabricated into a circular calibrated surface upon which the adjustable indexing means slides. In this embodiment, the sliding element contains an alignment marker and the bubble spirit level. Preferably, the circular calibrated surface is premolded with a series of ridges of one degree spacing which engage detents on the sliding element resulting in ease of angle inclination.

In the side handle attachment embodiment, a circularly calibrated disc that threads into the side handle hole is provided. A support arm pivotally attached at the side handle hole with spirit level mounted on the free end is also provided. In this embodiment, the support arm and circularly calibrated protractor disc can further be adapted to threadably accept the removable side handle such that tightening of the handle selectively holds the disc and support arm at the selected angle of tilt as indicated by a marker and calibration alignment.

It is an object of the present invention to provide an attachment to a conventional hand held drill that allows the operator to maintain the angle of inclination or tilt of the drill bit during drilling. It is a further object that the device employs a bull's-eye spirit level and protractor angle measurement such as to enhance the ability of the operator to maintain arbitrarily any selected angle during drilling with improved accuracy relative to previously known hand held devices. Fulfillment of these objects and the presence and fulfillment of other objects will be apparent upon complete reading of the specification and claims taken in conjunction with the attached drawings.

DESCRIPTION OF THE PREFERRED EMBODIMENTS

Figure 3:
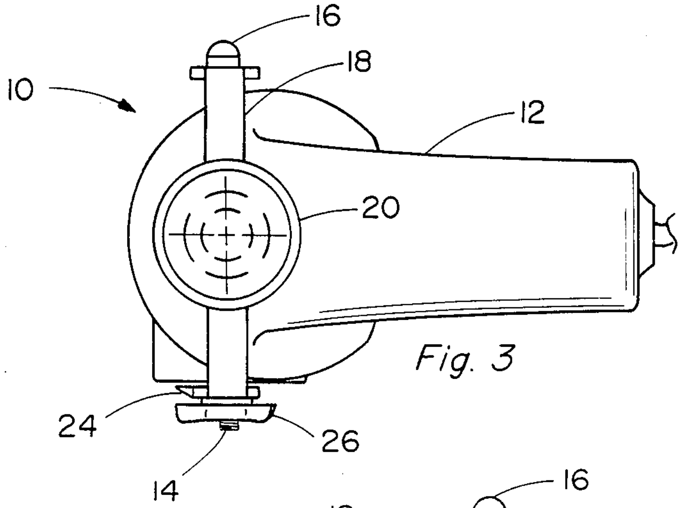
FIG. 3 is a rear view of the drill scope embodiment of FIG. 1.
Figure 2:
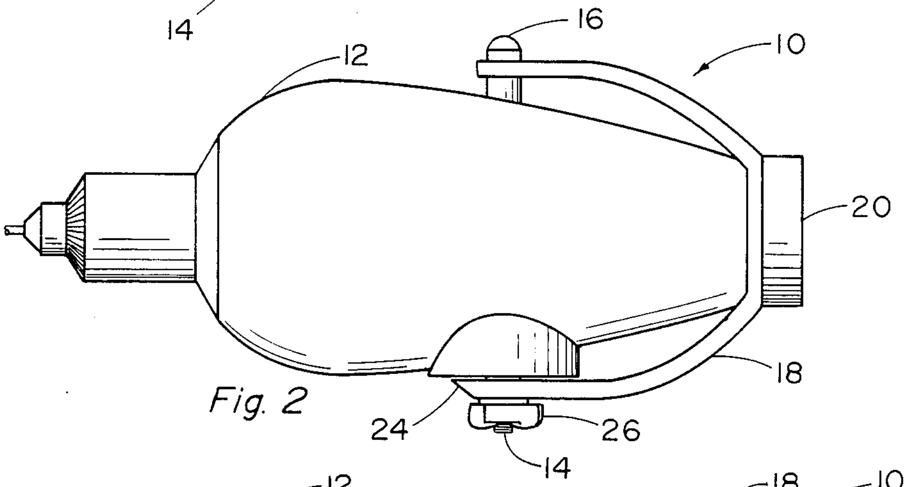
FIG. 2 is a top view of the drill scope embodiment of FIG. 1.
Figure 1:
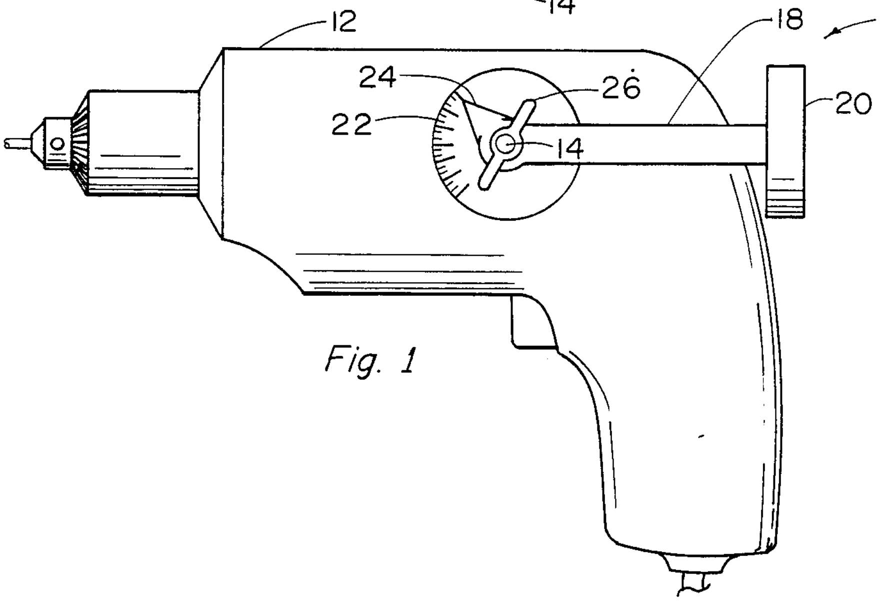
FIG. 1 is a side elevational view of a U-shaped pivoting drill scope with spirit level and calibrated protractor according to the present invention.
Figure 6:
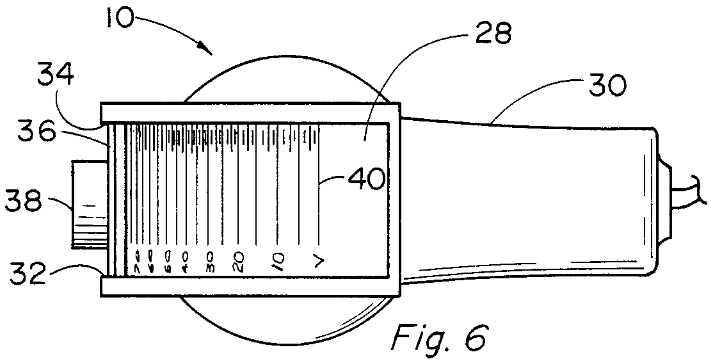
FIG. 6 is a rear view of the drill scope embodiment of FIG. 4.
Figure 5:
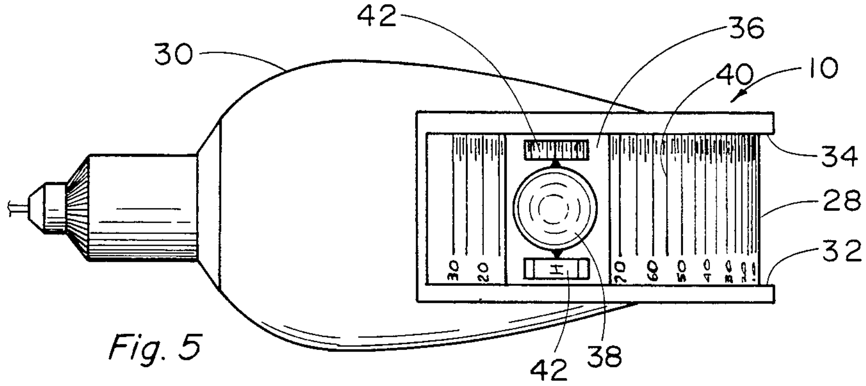
FIG. 5 is a top view of the drill scope embodiment of FIG. 4.
Figure 4:
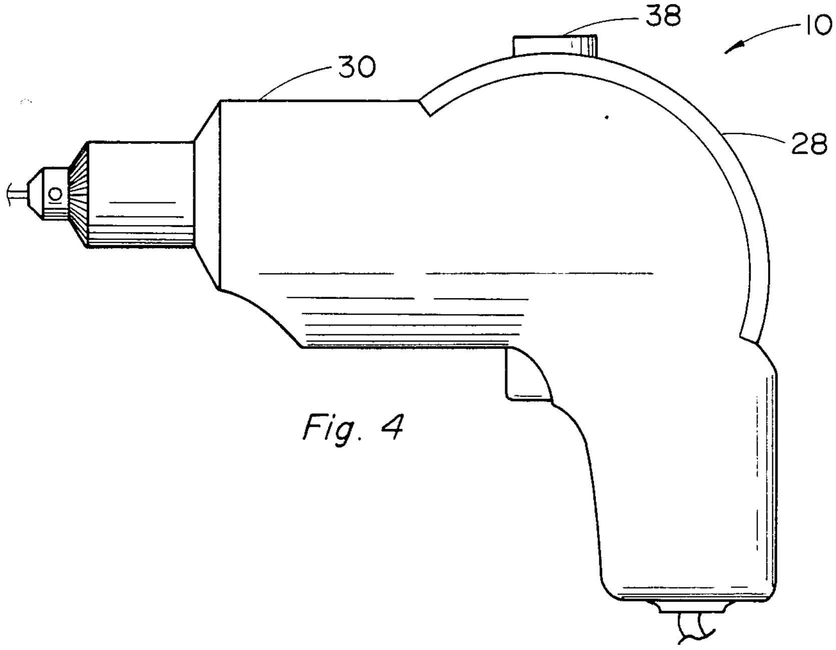
FIG. 4 is a side elevational view of a surface molded housing embodiment of the drill scope with a circular calibrated surface according to the present invention.

The drill scope according to the present invention, how it is incorporated into the conventional hand held drill, the advantages of using the same and how it differs from the prior art can perhaps be best explained and understood by reference to the drawings. FIGS. 1 through 3 illustrate one embodiment of the present invention wherein the drill scope, generally designated by the number 10, is attached to the housing of a conventional hand held drill 12. The drill can be generally any such device as well known in the art, including but not limited to, an electric drill, either plug in or portable, pneumatic drill or the equivalent. In this specific embodiment, the drill scope 10 is attached to both sides of the drill housing by use of pivoting or rotating attachment points 14 and 16. The attachment points 14 and 16 can be essentially any such element well known in the art, including bolts, screws, rivets, protruding axles with or without hub fasteners, detent and ball, or the like. As illustrated, a U-shaped member 18 straddles the drill housing with each end of the U-shaped member 18 being pivotally attached at points 14 and 16. This allows the U-shaped member 18 to freely swing over the rear and top of the drill 12. Midway through the curve of the U-shaped member 18 is a bull's-eye bubble spirit level 20 attached such that the concentric bubble float window can be readily observed by the drill operator. The spirit level 20 can also be essentially any such device as well known in the art. Preferably, a bull's-eye spirit level is to be employed. In particular, a bull's-eye spirit level with an interior liquid cavity having a venticular internal surface is to be used. More specifically, this double sided internal concave surface is useful in that it allows the reading of the level in an overhead (drill scope inverted) configuration as well as during ordinary usage.

One of the advantages of the novel drill scope according to the present invention is the fact that the sensitivity of determining when the spirit level is being held level is independent of the angle of the drill or range of angles of tilt. This is essentially accomplished by totally separating the two functions. Thus, the sensitivity and accuracy of measuring level is determined by the optics and the physical properties of the spirit level independent of the angle of the drill bit which is measured by a protractor means (as explained later). The independent determination of the angle of tilt of the drill 12 or more specifically, the drill bit, is achieved by providing for rotation of the U-shaped member 18. Because of this rotation motion, the entire spirit level 20 can be arbitrarily positioned at any relative angle to the drill. As indicated in the side view of FIG. 1, the drill 12 is provided with a protractor device 22 located at the pivot point 14 and calibrated in degrees or angle of tilt in the drill bit (axis of the drill bit). This protractor is rigidly attached (in this embodiment) to the drill housing during operation and preferably can be adjusted (calibrated) and then fastened to the drill 12 at the calibrated angle by a set screw or the like (not shown). The end of the U-shaped member 18 is further provided with a pointer 24 or the like which rotates with the U-shaped member 18 and spirit level 20. The wing nut 26 is provided to temporarily hold the U-shaped member 18 and spirit level 20 in the desired selected relative position to the drill 12 corresponding to the angle of tilt of the drilling as numerically read at pointer 24.

In other words, to use the drill scope 10 according to the embodiment of FIGS. 1 through 3, one merely sets the pointer at the desired angle of tilt or inclination and then tightens wing nut 26. The operator then proceeds to hold the drill such that the spirit level bubble 20 is zero or centered. The drill bit will now be tilted at the desired angle. By mounting the spirit level on a movable or rotating adjustable indexing means for determining the angle of inclination (the U-shaped member in this embodiment) and by providing a protractor scale for setting the angle, it has been the inventor's experience that accuracies within a few degrees or less can be readily achieved during drilling. This is felt to be far superior to other hand held drilling techniques and devices and far more flexible in that the present drill scope lends itself to arbitrarily any angle of drilling.

FIGS. 4 through 7 illustrate another specific embodiment of the drill scope 10 according to the present invention. In this embodiment, the scope 10 is preferably manufactured as an integral portion of the drill housing. As illustrated, a circularly curved surface 28 is molded into the top and rear portion of the drill 30, thus, giving that portion of the drill housing a somewhat circular characteristic appearance. This curved surface 28 is provided with a circular track or guide. In this specific case, the circular track or guide involves a pair of undercut grooves 32 and 34 which are provided along each side of the surface 28. A sliding element 36 is provided which fits between these grooves and is held therein such that it adjustably slides over the surface 28. A bull's-eye spirit level 38 is attached to the slide 36 such that the drill operator can again easily see the float bubble. The curved surface 28 is further calibrated in degrees of tilt 40 and the adjustable sliding element 36 is provided with a window marker 42 for viewing the protractor calibration marks 40.

Figure 7:
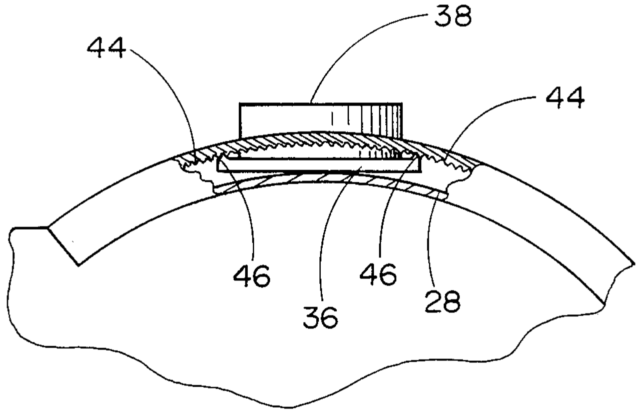
FIG. 7 is a close-up cut-away view of the curved calibrated surface of FIG. 1.

As illustrated in the cut-away view of FIG. 7, the curved surface 28 contains a series of ridges 44 and the corners of the adjustable element 36 have a pair of protruding elements 46 which serve to create an indexing effect when the element 36 slides over the surface 28. In this manner, the angle of tilt can be selected by essentially snapping the sliding adjustable indexing means 36 from one angle setting to the next.

Figure 9:
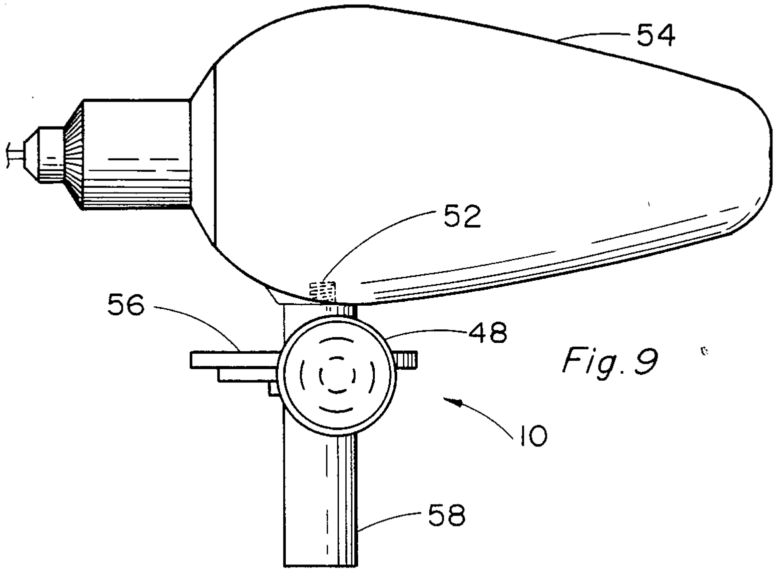
FIG. 9 is a top view of the drill scope embodiment of FIG. 8.
Figure 8:
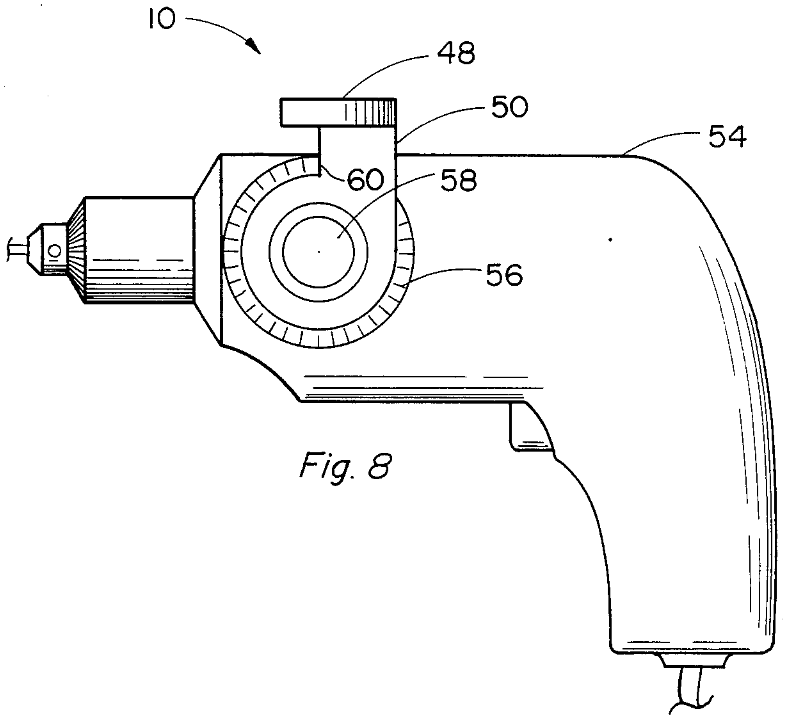
FIG. 8 is a side elevational view of a handle hole attaching embodiment of the drill scope according to the present invention.
Figure 10:
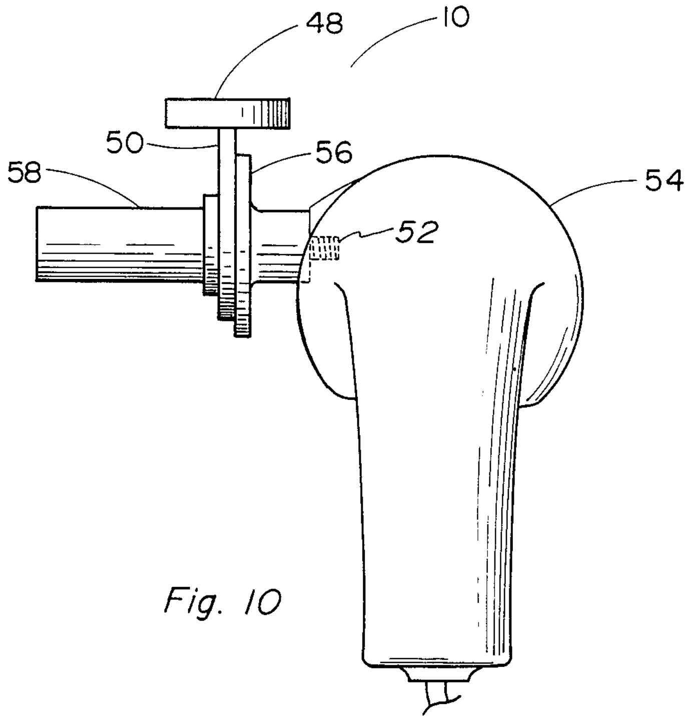
FIG. 10 is a rear view of the drill scope embodiment of FIG. 8.

FIGS. 8 through 10 illustrate an additional alternate embodiment of the drill scope according to the present invention wherein the drill scope 10 is adapted to thread directly into the side handle hole as provided by the original manufacturer of a hand held drill. As such, this particular embodiment is envisioned as being primarily useful as an after market attachment. However, one could readily mount this embodiment to any hand held drill by altering the drill housing.

As illustrated in FIGS. 8 through 10, the spirit level float 48 is mounted on the end of a support arm 50. The other end of the support arm 50 is pivotally attached at the side handle hole 52 of the drill 54. Thus, the support arm 50 with spirit level 48 make up the adjustable indexing means. The side handle hole 52 also accepts the circular calibrated protractor 56 which in turn is adapted to accept the side handle 58. The support arm 50 is compressively held between the drill 54 and the side handle 58 such that loosening and tightening the handle will allow the operator to align the marker 60 at the desired angle of tilt as read on the circular calibrated protractor scale 56. Having once aligned the support arm 50 and tightened the handle 58, the drill and drill scope can be used in a manner identical to the previously described embodiments.

Figure 11:
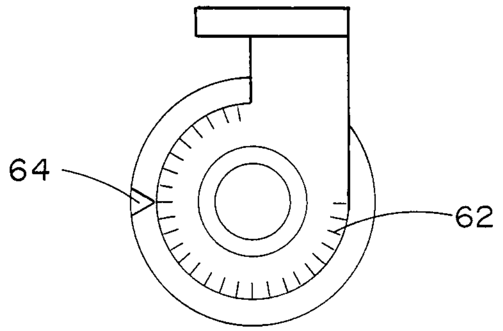
FIG. 11 is a side elevational view of an alternate embodiment of the calibrated protractor, alignment marker and adjustable indexing means according to the present invention.

As illustrated in FIG. 11, protractor scale 62 can also be attached to the pivoting or rotating adjustable means rather than being attached directly to the drill. In this alternative embodiment, the pointer 64 is affixed to the drill and can be a mark, scribe, detent, pointer or the equivalent. Similarly, an adjustable marker as well as a vernier scale can be incorporated (not shown) for calibration and greater accuracy. Also, it is contemplated that the relative length (radius) of the spirit level support means (whether U-shaped member, circular surface or support arm) can be lengthened to enhance the sensitivity of the setting. This is particularly useful in the embodiment of FIGS. 1 through 3 and 8 through 11.

The drill scope according to the present invention can be manufactured out of any conventional material well known in the art. Preferably, the U-shaped or support arm embodiment can be made from metal or plastic, while the circular surface version is preferably fabricated during the manufacturing of the drill housing out of the same material as the housing. The device as previously stated can be used in conjunction with virtually any hand held drill or the equivalent.

Having thus described the preferred embodiments with a certain degree of particularity, it is manifest that many changes can be made in the details of construction, arrangement and fabrication of the elements and their uses without departing from the spirit and scope of this invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. In a hand held drill the specific improvement comprising:

(a) a protractor means attached to said drill wherein said protractor means is a circular calibrated surface on the top back side of said drill and wherein said protractor means is calibrated in degree of tilt such as to correspond to the angle of tilt of the drill bit;

(b) an adjustable indexing means operably engaged to said drill and protractor means such as to be movable through and operative range of angles and be selectively held at one of said angles and wherein said adjustable indexing means is a sliding element operatively engaged to said circular calibrated surface such as to slide over said circular surface and align a marker on said adjustable indexing means with said calibrations of said circular surface such as to indicate which angle of tilt is selected and wherein said adjustable indexing means is further adapted to hold a bubble spirit level such that said bubble reads level when said drill bit is tilted at said selected angle; and (c) a bubble spirit level attached to said sliding element of said adjustable indexing means.

2. In a hand held drill the specific improvement comprising:

(a) a protractor means attached to said drill wherein said protractor means is at least one circularly calibrated disc mounted to the side of said drill calibrated in degree of tilt such as to correspond to the angle of tilt of the drill bit;

(b) an adjustable indexing means operably engaged to said drill and protractor means such as to be movable through an operative range of angles and be selectively held at one of said angles and wherein the index means cooperates with said calibration of said protractor means such as to indicate which angle of tilt is selected and wherein said adjustable indexing means is a U-shaped member that straddles the drill having both ends of said U-shaped member pivotally attached to said drill and at least one end pivotally centered at said circularly calibrated disc such that a marker on said end of said U-shaped member indexes the selected angle and wherein said adjustable indexing means is further adapted to hold a bubble spirit level such that said bubble level reads level when said drill bit is tilted at said selected angle; and (c) a bubble spirit level is attached to the U-shaped member of said adjustable indexing means midway through the curve.

3. In a hand held drill wherein said hand held drill comprises a housing with a side handle adapted to reversibly attach to the side of said drill housing by threading into and out of a threaded hole in the side of said drill thus forming a removable handle extending perpendicular to the longitudinal direction of the drill bit the specific improvement comprising:

(a) a protractor means attached to said drill wherein said protractor means is calibrated in degree of tilt such as to correspond to the angle of tilt of the drill bit and wherein said protractor means is a circularly calibrated disc that threadably mounts to the side of said drill by threading into said hole for said removable handle;

(b) an adjustable indexing means operably engaged to said drill and pivotally attached to said protractor means such as to rotate about the axis of said threaded hole and center of said circular calibration disc such as to align a marker on said adjustable indexing means with said calibrations on said disc such as to indicate which angle of tilt is selected and wherein said protractor means and said adjustable indexing means that rotate about the axis of said threaded hole for accepting said removable side handle are further adapted to threadably accept said removable side handle such that tightening of said handle selectively holds said adjustable indexing means and wherein said adjustable indexing means is further adapted to hold a bubble spirit level such that said bubble reads level when said drill bit is tilted at said selected angle; and (c) a bubble spirit level attached to said adjustable indexing means.

4. A hand drill angle of inclination attachment comprising:

(a) a circularly calibrated protractor disc adapted to threadably mount into the side hole of a hand held drill originally intended for reversibly mounting a side handle perpendicular to the direction of drilling wherein said disc is calibrated in degree of tilt such as to correspond to the angle of tilt of the drill bit;

(b) a support arm means pivotally engaged to said circularly calibrated protractor disc such as to rotate about the center axis of said disc and wherein said support arm means is equipped with a marker that pivotally aligns with said calibration of said protractor disc and indicates the selected angle of tilt of said drill bit when said drill bit is held such that a bubble level mounted to the unattached end of said support arm reads level and wherein the circularly calibrated protractor disc and support arm means are further adapted to threadably accept a removable side handle such that tightening of said handle selectively holds said disc and support means at the selected angle of tilt as indicated by said marker and calibration alignment; and (c) a bubble spirit level mounted on said support arm such that it swings through a range of angles of tilt as measured by said marker and calibration alignment.

* * * * *